United States Patent
He et al.

(10) Patent No.: US 8,926,814 B2
(45) Date of Patent: Jan. 6, 2015

(54) APPARATUS AND METHOD FOR ELECTROKINETIC IN-SITU LEACHING REMEDIATION OF SOIL

(71) Applicant: North China Electric Power University, Beijing (CN)

(72) Inventors: Li He, Beijing (CN); Jiaqi Zhang, Beijing (CN); Shichao Sun, Beijing (CN); Hongwei Lu, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 14/252,723

(22) Filed: Apr. 14, 2014

(65) Prior Publication Data
US 2014/0339086 A1 Nov. 20, 2014

(51) Int. Cl.
*B01D 61/56* (2006.01)
*B09C 1/02* (2006.01)

(52) U.S. Cl.
CPC .................................. *B09C 1/02* (2013.01)
USPC ........... 204/515; 204/516; 204/517; 204/647; 204/648

(58) Field of Classification Search
CPC ...... B09C 1/02; B09C 1/085; B09C 2101/00; B01D 61/56
USPC .......................... 204/515, 516, 517, 647, 648
See application file for complete search history.

(56) References Cited

U.S. PATENT DOCUMENTS 5,458,747 A * 10/1995 Marks et al. ................... 205/702
6,086,739 A * 7/2000 Hodko ........................... 204/515

OTHER PUBLICATIONS

First Office Action in CN Patent Application No. 201310186382.7, mailed Jan. 28, 2014.
Second Office Action in CN Patent Application No. 201310186382.7, mailed May 6, 2014.

* cited by examiner

*Primary Examiner* — Arun S Phasge
(74) *Attorney, Agent, or Firm* — Syncoda LLC; Feng Ma

(57) ABSTRACT

This invention relates to environment protection, and discloses apparatus and method for electrokinetic in-situ leaching remediation of contaminated soil. The apparatus includes a DC electrical source, electrode chambers, electrodes, permeable reactive barriers (PRBs), electrode solution pH testers, electrode solution extraction tubes, a heating pipe network, a heat exchanger, leacheate sprayers, acid-base adjusting solution sprayers, a multichannel peristaltic pump, automatic control devices, an electrode solution storage tank, an electrode solution treatment pond, an in-line pump, single-channel peristaltic pumps, a flowmeter, a time control device, a leacheate storage tank, an acid solution storage tank, an alkali solution storage tank, and soil pH testers. Through electrokinetic enhanced leaching, heating pipe network and PRBs to optimize remediation and accelerate remediation rate, and automatic control devices and recycling of electrode solution to elevate the automation level and increase resource recycling rate, a faster and better remediation at a lower cost can be achieved.

6 Claims, 1 Drawing Sheet

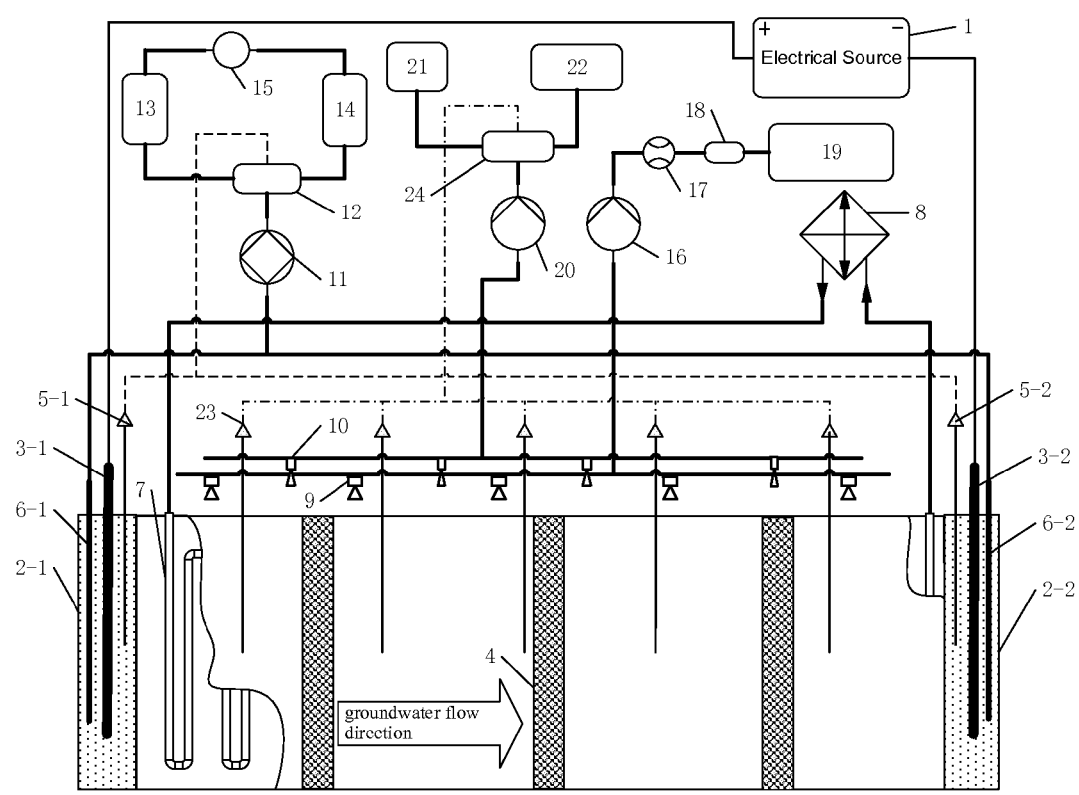

APPARATUS AND METHOD FOR ELECTROKINETIC IN-SITU LEACHING REMEDIATION OF SOIL

CROSS-REFERENCE TO RELATED APPLICATIONS

The present application is a continuation of, and claims priority to, Chinese Patent Application No. 201310186382.7 filed May 20, 2013, the disclosure of which is hereby incorporated by reference in its entirety.

BACKGROUND

With the rapid development in agriculture and industry, a large amount of pesticides, fertilizers and industrial contaminants have entered into the soil and groundwater. Because soil and groundwater are the resources essential for human survival, the contaminants that reside therein can enter human bodies through food chain and drinking water sources. Unlike surface water that is convenient for centralized processing, the contaminated soil and groundwater are better to be treated by in-situ remediation.

The mechanisms of soil to retain metals can be divided into two major categories: one is to absorb metals on the surface of soil constituents in their ionic state; the other is to form sediment of metallic compounds. At present, one single pollutant rarely exists in the soil environment. Combined pollution of inorganic and organic contaminants poses a threat to human health and ecological safety, and arouses people's concern. Leaching of contaminated soil to wipe out pollutants by use of fluid leacheate is a remediation process that can be performed in situ or ex situ. The liquid leacheate can be water, chemical solvents or other fluids that can leach pollutant from soil, and a leacheate can even be a gas. The in-situ leaching approach does not need to excavate all contaminated soils and transport them to other places for treatment, which not only reduces transportation costs but also avoids the spread of pollutant produced during excavation and transportation of the contaminated soils. The mechanism for electrokinetic remediation of contaminated soil is as follows: the two ends of the contaminated soil are applied with low-voltage direct current (DC) electric field to form a potential gradient; under the effects of electroosmosis and electromigration in the electric field, the contaminants (such as heavy metals or organic pollutants) are migrated to electrode chambers; and then the electrode solution is further processed to remove the contaminants ultimately.

Research on leaching of contaminated soil is mainly focused on surfactants that are used as leacheates. A surfactant can increase the water solubility of organic matters and enhance the removal rate of contaminants. Biosurfactants feature the merits of low cost, easy degradability and large surface activity etc. As a biological metabolite, a biosurfactant does not cause secondary pollution to soil, and the active agents that remain after soil leaching also reduce the nutrition loss from the soil. During the actual leaching process, some technical conditions, such as concentration of leacheate, speed of leaching, quantity of leacheate and ambient temperature, must be considered in order that leaching can achieve optimal results. As a technology combining components from both conventional leaching and electrokinetic techniques, it is necessary to choose conditions, such as soil pH value, that are suitable for both techniques to be used as the end reaction conditions. In addition, specific requirements for each technique also need to be considered. The gist of this invention is to combine multiple remediation techniques and make overall considerations to choose the reaction conditions that can achieve optimal effects.

SUMMARY

This invention relates to the technical field of environment protection, and in particular to an electrokinetic in-situ leaching remediation apparatus and method of use thereof for cleaning contaminated soil. For the purpose of decontaminating soils polluted by heavy metals and organic matters, this invention discloses an electrokinetic in-situ leaching remediation apparatus for contaminated soils and the method of use thereof.

An electrokinetic in-situ leaching remediation apparatus for contaminated soils, of which some features are described as follows:

A DC electrical source (1) is connected to an anode electrode (3-1) and a cathode electrode (3-2), respectively. The anode electrode (3-1) is arranged in an anode chamber (2-1) while the cathode electrode (3-2) is arranged in a cathode chamber (2-2). A first automatic control device (12) is connected to an anode electrode solution extraction tube (6-1) and a cathode electrode solution extraction tube (6-2) through a multichannel peristaltic pump (11). The anode electrode solution extraction tube (6-1) and the cathode electrode solution extraction tube (6-2) are respectively arranged in the anode chamber (2-1) and the cathode chamber (2-2). An electrode solution storage tank (13) and an electrode solution treatment pond (14) are respectively connected to the first automatic control device (12) through pipelines. The electrode solution treatment pond (14) is connected to the electrode solution storage tank (13) through pipelines and an in-line pump (15). An anode chamber electrode solution pH tester (5-1) and a cathode chamber electrode solution pH tester (5-2) are respectively inserted into the anode chamber (2-1) and the cathode chamber (2-2), and connected with the first automatic control device (12) through wires. Permeable reactive barriers (PRBs) (4) are arranged in the polluted area evenly. A heating pipe network (7) is connected with a heat exchanger (8) through pipelines. Leacheate sprayers (9) are arranged evenly above the polluted area, and are connected with a first single-channel peristaltic pump (16), a flowmeter (17), a time control device (18) and a leacheate storage tank (19) through pipelines. Acid-base adjusting solution sprayers (10) are arranged evenly above the polluted area. An acid solution storage tank (21) and an alkali solution storage tank (22) are respectively connected to a second automatic control device (24) through pipelines and are further connected to the acid-base adjusting solution sprayers (10) through a second single-channel peristaltic pump (20). Soil pH testers (23) are evenly arranged in the polluted area and are connected to the second automatic control device (24) through wires.

A method for soil remediation using the above-mentioned apparatus, in which:

1) the anode chamber (2-1) and the cathode chamber (2-2) are arranged in two ends of a polluted area in a manner perpendicular to groundwater flow direction; the anode chamber (2-1) is arranged upstream of the groundwater flow in the polluted area such that the direction of electric field is in line with the groundwater flow direction after the DC electrical source (1) is started;

2) the permeable reactive barriers (4) are arranged evenly between the two electrode chambers within the polluted area;

3) the heating pipe network (7) are arranged longitudinally within the polluted area; a target soil temperature is adjusted to be 40-60° C.; the heating pipe network (7) is injected with a conduction oil and the conduction oil is heated by the heat exchanger (8) such that the conduction oil reaches a temperature 10-15° C. higher than the target soil temperature;

4) a leacheate is sprayed to the polluted area through the leacheate sprayers (9), with a total volume of the leacheate 6 times the soil volume, and at a set speed of 2 mL/min for the leacheate sprayers (9);

5) an electrode solution is injected into the electrode solution storage tank (13); an acid solution is injected into the acid solution storage tank (21); and an alkali solution is injected into the alkali solution storage tank (22);

6) leaching cycles are controlled by the time control device (18), wherein: according to existing concentration and target remediation concentration of pollutants, the median value of the two concentrations is set as middle concentration; according to the existing concentration, median concentration and target remediation concentration of the pollutants, the leaching cycles are set into three levels: 6, 12 and 24 hours, with the decrease of pollutant concentration; and leaching period in each cycle is set to be 5 hours;

7) the soil pH testers (23) are arranged within the polluted area; the second automatic control device (24) can control the acid solution storage tank (21) and the alkali solution storage tank (22) to spray an acid solution or an alkali solution to the soil through the acid-base adjusting solution sprayers (10), in order to maintain the pH value of the electrode soil between 8-10;

8) the anode chamber electrode solution pH tester (5-1) and the cathode chamber electrode solution pH tester (5-2) measure the pH values of the electrode solution to inspect whether the electrode solution is saturated; under control of the first automatic control device (12), saturated electrode solution is sucked out through the anode electrode solution extraction tube (6-1) or the cathode electrode solution extraction tube (6-2) and is further injected into the electrode solution treatment pond (14), then a new electrode solution is injected into the anode and cathode chambers; after the recycled electrode solution is mixed and treated, the treated electrode solution can serve as the new electrode solution, and can be further transferred to the electrode solution storage tank (13) through the single-channel peristaltic pump (15).

The conduction oil described in step 3) can be alkylbenzene synthetic conduction oil;

The leacheate described in step 4) is a biosurfactant which can be rhamnolipid having 1.5% volume concentration;

The electrode solution described in step 5) is a mixed solution of sodium sulfate and sodium carbonate, with the sodium molar concentration being 0.025 mol/L;

The acid solution described in step 5) is 5% volume fraction of HCl solution, and the alkali solution described in step 5) is 1% mass fraction of NaOH solution;

The benefits of this invention may include: PRB installed within the polluted area between electrode chambers can increase the remediation speed significantly; the heating equipment installed in the polluted area can enhance the rate of contaminant removal greatly, especially in cold regions; the electrokinetic leaching technology can simultaneously treat soil and groundwater contaminated by heavy metals and organic matters, and the further combination of PRB technology can greatly accelerate the remediation speed; the joint use of pH testers and automatic control devices can greatly reduce the demand for maintenance staff; recycling of electrode solution also reduces the operational cost; the combination of the electrokinetic and PRB technologies makes this disclosed apparatus capable of in situ treating both heavy metals and organic pollutants in soil and groundwater simultaneously.

BRIEF DESCRIPTION OF THE DRAWINGS

FIG. 1 is a structure diagram of an electrokinetic in-situ leaching remediation apparatus for contaminated soil.

Each number represents:
1—DC electrical source, 2-1—anode chamber, 2-2—cathode chamber, 3-1—anode electrode, 3-2—cathode electrode, 4—permeable reactive barrier (PRB), 5-1—anode chamber electrode solution pH tester, 5-2—cathode chamber electrode solution pH tester, 6-1—anode electrode solution extraction tube, 6-2—cathode electrode solution extraction tube 7—heating pipe network, 8—heat exchanger, 9—leacheate sprayer, 10—acid-base adjusting solution sprayer, 11—multichannel peristaltic pump, 12—first automatic control device, 13—electrode solution storage tank, 14—electrode solution treatment pond, 15—in-line pump, 16—first single-channel peristaltic pump, 17—flowmeter, 18—time control device, 19—leacheate storage tank, 20—second single-channel peristaltic pump, 21—acid solution storage tank, 22—alkali solution storage tank, 23—soil pH tester, 24—second automatic control device.

DETAILED DESCRIPTION

Embodiment 1

A method for soil remediation using the electrokinetic in-situ leaching remediation apparatus as shown in FIG. 1, of which some specifics are disclosed as follows:

A soil sample ~20-40 cm deep from the ground surface was taken from the campus of North China Electric Power University and Beijing Agricultural College. The soil sample was dried at 60° C. using a muffle furnace, followed by crushing and screening using 8 and 20 mesh soil sieves sequentially. The soil sample was contaminated with 500 mg/L of lead and 1000 mg/L of poly-chlorinated biphenyls (PCBs). The soil sample was put into an organic glass box with a size of 30 cm×10 cm×10 cm. Sinks were arranged on both sides of the box, and the groundwater flow was simulated through a peristaltic pump. The inlet and outlet water levels were maintained at 50 cm and 49 cm, respectively.

An electrokinetic in-situ leaching remediation apparatus as shown in FIG. 1 was assembled. A DC electrical source 1 was connected to an anode electrode 3-1 and a cathode electrode 3-2 respectively. The anode electrode 3-1 was arranged in an anode chamber 2-1, and the cathode electrode 3-2 was arranged in a cathode chamber 2-2. A first automatic control device 12 was connected respectively to an anode electrode solution extraction tube 6-1 and a cathode electrode solution extraction tube 6-2 through a multichannel peristaltic pump 11. The anode electrode solution extraction tube 6-1 and the cathode electrode solution extraction tube 6-2 were respectively arranged in the anode chamber 2-1 and the cathode chamber 2-2. An electrode solution storage tank 13 and an electrode solution treating pond 14 were respectively connected to the first automatic control assembly 12 through pipelines. The electrode solution treating pond 14 was connected to the electrode solution storage tank 13 through pipelines and an in-line pump 15. An anode chamber electrode solution pH tester 5-1 and a cathode chamber electrode solution pH tester 5-2 were respectively inserted into the anode chamber 2-1 and the cathode chamber 2-2, and connected into the first automatic control device 12 through wires. PRBs 4 were arranged in the polluted area evenly. A heating pipe network 7 was connected to a heat exchanger 8 through pipelines. Leacheate sprayers 9 were arranged evenly above the polluted area, and were connected with a first single-channel peristaltic pump 16, a flowmeter 17, a time control device 18 and a leacheate storage tank 19 through pipelines. Acid-base adjusting solution sprayer 10 were arranged evenly above the polluted area. An acid solution storage tank 21 and an alkali solution storage tank 22 were respectively connected to a second automatic control device 24 through pipelines and were further connected to the acid-base adjusting solution sprayers 10 through a second single-channel peristaltic pump. Soil pH testers 23 were evenly arranged in the polluted area and were connected to the second automatic control device 24 through wires.

In the above apparatus, heating pipe network 7 was longitudinally mounted in polluted area. In order to keep the target temperature of soil between 40 to 60° C., the temperature of the conduction oil in the heating pipe network was maintained between 50° C. and 75° C. (Alkylbenzene synthetic conduction oil was used here). A leacheate with 1.5% volume concentration rhamnolipid (a biosurfactant) was prepared to be sprayed to the polluted area through leacheate sprayer 9. The total volume of leacheate sprayed was controlled to be 6 times the volume of the soil sample. Speed of the leacheate sprayers 9 was set to be 2 mL/min, and the sprayers were located at 5 cm, 15 cm, 25 cm along the longitudinal center line of the organic glass box. An electrode solution was prepared, which contained a mixed solution of sodium sulfate and sodium carbonate, with the sodium concentration being 0.025 mol/L, and the electrode solution was injected into the anode chamber 2-1, the cathode chamber 2-2, and the electrode solution storage tank 13. The soil pH testers 23 were arranged within the polluted area to keep the pH value of the electrode soil between 8-10. When pH value was less than this scope, the second automatic control device 24 could signal the acid-base adjusting solution sprayers 10 to spray an alkali solution from the alkali solution storage tank 22 into the soil to neutralize the pH value to the appropriate scope. Otherwise it would control the spraying by connecting the acid solution storage tank 21. The acid solution storage tank 21 and the alkali solution storage tank 22 were injected with an acid solution and an alkaline solution, respectively. The acid solution was 5% volume fraction of HCl solution and the alkali solution was 1% mass fraction of NaOH solution. Leaching cycles were controlled by the time control device 18. The leaching period of each leaching cycle was set to be 5 hours, and the leaching cycle was set as 6, 12 and 24 hours respectively, and for each leaching cycle the apparatus was run for 3 times, 3 times and 4 times respectively. The anode chamber electrode solution pH tester (5-1) and the cathode chamber electrode solution pH tester (5-2) could measure the pH values of the electrode solution in the anode chamber and cathode chamber respectively, in order to examine whether the electrode solution was saturated. If so, the second automatic control device 24 could signal the apparatus to suck out the saturated electrode solution into the electrode solution treatment pond 14, and then to inject new electrode solution. The recycled electrode solution could be mixed, appropriately treated, and the treated solution could serve as a new electrode solution to be further transferred to the electrode solution storage tank (13) through the single-channel peristaltic pump (15). In this embodiment, after 124-hour running of the whole apparatus, the removal rate of lead was 95% and the removal rate of PCBs was 99%.

The invention claimed is:

1. An electrokinetic in-situ leaching remediation apparatus for contaminated soils, comprising:

a DC electrical source (1) connected to an anode electrode (3-1) and a cathode electrode (3-2), respectively; wherein the anode electrode (3-1) is arranged in an anode chamber (2-1) while the cathode electrode (3-2) is arranged in a cathode chamber (2-2); a first automatic control device (12) connected to an anode electrode solution extraction tube (6-1) and a cathode electrode solution extraction tube (6-2) through a multichannel peristaltic pump (11); wherein the anode electrode solution extraction tube (6-1) and the cathode electrode solution extraction tube (6-2) are respectively arranged in the anode chamber (2-1) and the cathode chamber (2-2); an electrode solution storage tank (13) and an electrode solution treatment pond (14) respectively connected to the first automatic control device (12) through pipelines; wherein the electrode solution treatment pond (14) is connected to the electrode solution storage tank (13) through pipelines and an in-line pump (15); an anode chamber electrode solution pH tester (5-1) and a cathode chamber electrode solution pH tester (5-2) respectively inserted into the anode chamber (2-1) and the cathode chamber (2-2), and connected with the first automatic control device (12) through wires; permeable reactive barriers (PRBs) (4) arranged in a contaminated area evenly; a heating pipe network (7) connected with a heat exchanger (8) through pipelines; leacheate sprayers (9) arranged evenly above the contaminated area, and connected with a first single-channel peristaltic pump (16), a flowmeter (17), a time control device (18) and a leacheate storage tank (19) through pipelines; acid-base adjusting solution sprayers (10) arranged evenly above the contaminated area; an acid solution storage tank (21) and an alkali solution storage tank (22) respectively connected to a second automatic control device (24) through pipelines and further connected to the acid-base adjusting solution sprayers (10) through a second single-channel peristaltic pump (20); soil pH testers (23) evenly arranged in the contaminated area and connected to the second automatic control device (24) through wires.

2. A method for soil remediation using the apparatus of claim 1, wherein:
1) the anode chamber (2-1) and the cathode chamber (2-2) are arranged in two ends of the contaminated area in a manner perpendicular to groundwater flow direction; the anode chamber (2-1) is arranged upstream of the groundwater flow in the contaminated area such that the direction of electric field is in line with the groundwater flow direction after the DC electrical source (1) is started;
2) the permeable reactive barriers (4) are arranged evenly between the two electrode chambers within the contaminated area;
3) the heating pipe network (7) are arranged longitudinally within the contaminated area; a target soil temperature is adjusted to be 40-60° C.; the heating pipe network (7) is injected with a conduction oil and the conduction oil is heated by the heat exchanger (8) such that the conduction oil reaches a temperature 10-15° C. higher than the target soil temperature;
4) a leacheate is sprayed to the contaminated area through the leacheate sprayers (9), with a total volume of the leacheate 6 times the soil volume, and at a set speed of 2 mL/min for the leacheate sprayers (9), wherein the leacheate is a biosurfactant;
5) an electrode solution is injected into the electrode solution storage tank (13); an acid solution is injected into the acid solution storage tank (21); and an alkali solution is injected into the alkali solution storage tank (22);

6) leaching cycles are controlled by the time control device (18), wherein: according to existing concentration and target remediation concentration of pollutants, the median value of the two concentrations is set as middle concentration; according to the existing concentration, median concentration and target remediation concentration of the pollutants, the leaching cycles are set into three levels: 6, 12 and 24 hours, with the decrease of pollutant concentration; and leaching period in each cycle is set to be 5 hours;

7) the soil pH testers (23) are arranged within the contaminated area; the second automatic control device (24) can control the acid solution storage tank (21) and the alkali solution storage tank (22) to spray an acid solution or an alkali solution to the soil through the acid-base adjusting solution sprayers (10), in order to maintain the pH value of the electrode soil between 8-10;

8) the anode chamber electrode solution pH tester (5-1) and the cathode chamber electrode solution pH tester (5-2) measure the pH values of the electrode solution to inspect whether the electrode solution is saturated; under control of the first automatic control device (12), saturated electrode solution is sucked out through the anode electrode solution extraction tube (6-1) or the cathode electrode solution extraction tube (6-2) and is further injected into the electrode solution treatment pond (14), then a new electrode solution is injected into the anode and cathode chambers; after the recycled electrode solution is mixed and treated, the treated electrode solution can serve as the new electrode solution, and can be further transferred to the electrode solution storage tank (13) through the single-channel peristaltic pump (15).

3. The method of claim 2, wherein the conduction oil described in step 3) is alkylbenzene synthetic conduction oil.

4. The method of claim 2, wherein the biosurfactant described in step 4) is rhamnolipid having 1.5% volume concentration.

5. The method of claim 2, wherein the electrode solution described in step 5) is a mixed solution of sodium sulfate and sodium carbonate, with the sodium molar concentration being 0.025 mol/L.

6. The method of claim 2, wherein the acid solution described in step 5) is 5% volume fraction of HCl solution, and the alkali solution is 1% mass fraction of NaOH solution.

* * * * *